United States Patent [19]
Wilson

[11] Patent Number: 6,060,689
[45] Date of Patent: May 9, 2000

[54] PORTABLE WELDING VENTILATION SYSTEM

[76] Inventor: Tim R. Wilson, 1805 2nd Ave. North, Moorhead, Minn. 56560

[21] Appl. No.: 09/027,840

[22] Filed: Feb. 23, 1998

[51] Int. Cl.[7] ...................................................... B23K 9/16
[52] U.S. Cl. ........................ 219/137.41; 219/136; 454/68
[58] Field of Search .............................. 219/137.41, 136; 454/68, 63–67

[56] References Cited

U.S. PATENT DOCUMENTS

| | | | |
|---|---|---|---|
| 4,606,260 | 8/1986 | Donald | 98/115.3 |
| 5,410,120 | 4/1995 | Kenneth | 219/137.41 |
| 5,702,296 | 12/1997 | Grano et al. | 454/200 |

*Primary Examiner*—Patrick Ryan
*Assistant Examiner*—Anjan Dey
*Attorney, Agent, or Firm*—Michael S. Neustel

[57] ABSTRACT

A portable welding ventilation system for extracting harmful welding fumes away from a welder without requiring the welder to wear an uncomfortable respirator. The inventive device includes a seat having a plurality of air nozzles, an exhaust fan, and a pair of side members removably attachable between the seat and the exhaust fan. The air nozzles within the seat release pressurized air toward the welding area thereby pushing the welding fumes away from the welder. The welding fumes are thereafter drawn into an intake manifold of the exhaust fan and then released a safe distance away from the welder through an exhaust tube. Flange about the intake manifold reduces the amount of fresh air drawn into the intake manifold.

15 Claims, 4 Drawing Sheets

PORTABLE WELDING VENTILATION SYSTEM

BACKGROUND OF THE INVENTION

1. Field of the Invention

The present invention relates generally to ventilation devices and more specifically it relates to a portable welding ventilation system for extracting harmful welding fumes away from a welder.

Welders are in constant contact with airborne particles which can be harmful to their health. Welders either breath the harmful fumes directly or wear uncomfortable respirators with a HEPA filter. When using a respirator, the welder is still constantly in physical contact with the welding fumes, especially airborne manganese, and other airborne debris. If there is a leak in the respirator, the welder will breath in a greater portion of the welding fumes than desired.

Respirators can become irritating for a welder since airborne debris becomes accumulated around the seal portion of the respirator. Also, because of the intense heat associated with welding, the welder is likely to perspire while wearing a respirator. Because of the irritations associated with respirators, workers are inclined to remove the respirator, especially towards the end of a long work day. Hence, there is a need for a portable welding ventilation system which overcomes the shortcomings in the prior art.

2. Description of the Prior Art

There are numerous welding ventilation devices. For example, U.S. Pat. No. 3,914,796 to Barta; U.S. Pat. No. 5,491,320 to Taylor; U.S. Pat. No. 4,268,282 to MacKenzie; U.S. Pat. No. 4,333,745 to Zeanwick; U.S. Pat. No. 4,109,144 to Vidmar; U.S. Pat. No. 5,174,682 to Whitfield; U.S. Pat. No. 4,249,785 to Hapgood et al; U.S. Pat. No. 4,945,604 to Miner et al; U.S. Pat. No. 4,226,363 to Sheldon; U.S. Pat. No. 4,694,141 to Hahn all are illustrative of such prior art.

Taylor (U.S. Pat. No. 5,491,320) discloses a method and apparatus for ventilating a robotic welding enclosure comprising a hood, an annular skirt surrounding the feed axis forming a capture chamber, and a means for creating a vacuum within the capture chamber so as to suck out welding fumes generated within.

MacKenzie (U.S. Pat. No. 4,268,282) discloses a workbench and air filter unit for extracting contaminated air within the work bench.

Zeanwick (U.S. Pat. No. 4,333,745) discloses a workbench filtering station comprised of a station having a work cavity within, and a filter system for filtering contaminated air within the workbench.

While these devices may be suitable for the particular purpose to which they address, they are not as suitable for extracting harmful welding fumes away from a welder. The prior art respirators are uncomfortable for a welder to wear during welding. The ventilated workbench prior art is not portable enough to be brought to a remote work site, much less to work on rails on a railroad.

In these respects, the portable welding ventilation system according to the present invention substantially departs from the conventional concepts and designs of the prior art, and in so doing provides an apparatus primarily developed for the purpose of extracting harmful welding fumes away from a welder.

SUMMARY OF THE INVENTION

A primary object of the present invention is to provide a portable welding ventilation system that will overcome the shortcomings of the prior art devices.

Another object is to provide a portable welding ventilation system that significantly reduces the amount of welding fumes a welder is in constant contact with.

An additional object is to provide a portable welding ventilation system that allows a welder to utilize a conventional welding mask.

A further object is to provide a portable welding ventilation system that reduces the amount of welding fumes a welder breaths since there is no uncomfortable respirator to remove.

Another object is to provide a portable welding ventilation system that efficiently removes welding fumes and debris to allow a better view of the material being welded.

Still another object is to provide a portable welding ventilation system that easily satisfies OSHA's Permissible Exposure Limit (PEL) of 200 $\mu g/m^3$ concentration of manganese for an eight-hour time-weighted average without utilizing a conventional respirator.

Still another object is to provide a portable welding ventilation system that easily satisfies OSHA's Permissible Exposure Limit (PEL) of 5 $mg/m^3$ concentration of total welding fumes for an eight-hour time-weighted average without utilizing a conventional respirator.

Another object is to provide a portable welding ventilation system which increases worker comfort by not requiring an uncomfortable respirator when welding for extended periods of time.

Another object is to provide a welding ventilation system which is relatively lightweight and compact for utilization in remote areas.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
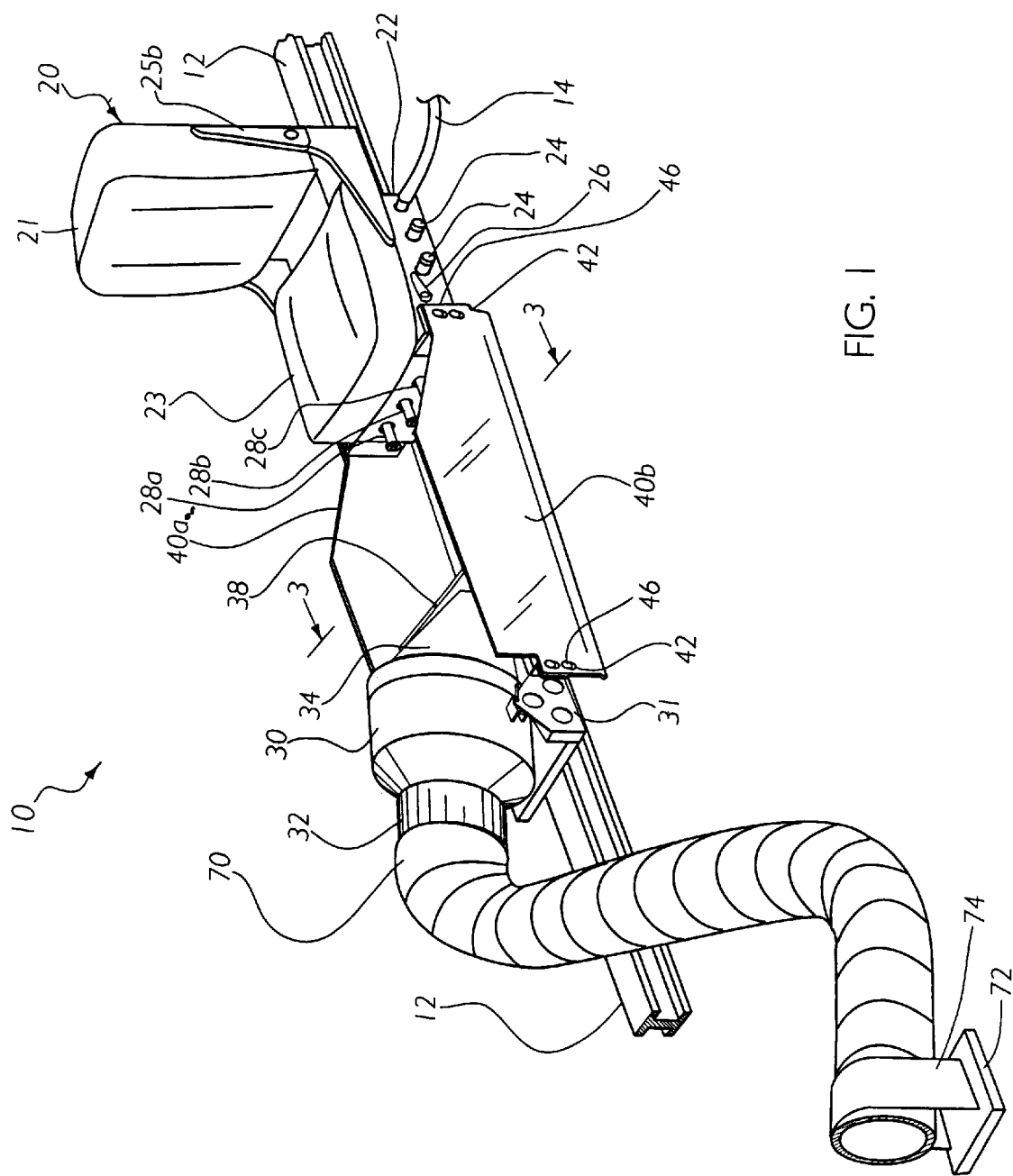
FIG. 1 is an upper perspective view of the present invention positioned upon a rail.

Turning now descriptively to the drawings, in which similar reference characters denote similar elements throughout the several view, FIGS. 1 through 4 illustrate a portable welding ventilation system 10, which comprises a seat 20 having a plurality of air nozzles 28, an exhaust fan 30, and a pair of side members 40a–b removably attachable between the seat 20 and the exhaust fan 30. The air nozzles 28 within the seat 20 release pressurized air toward the welding area thereby propelling the welding fumes away from the welder. The welding fumes are thereafter drawn into an intake manifold 34 of the exhaust fan 30 and then released a safe distance away from the welder through an exhaust tube 70. Flange 38 about the intake manifold 34 reduces the amount of fresh air drawn into the intake manifold 34.

The Occupational Safety and Health Administration (OSHA) has set Permissible Exposure Limits (PEL) for the manganese concentration and the total welding fume concentrations. The OSHA PEL for manganese concentration is 200 $\mu$g/m$^3$ for an eight-hour workday and the OSHA PEL for total welding fume concentrations is 5 mg/m$^3$ for an eight-hour workday. The present invention has been field tested with the results of having a manganese concentration of 11.48 $\mu$g/m$^3$ for an eight-hour workday and a total welding fume concentration of 0.09 mg/m$^3$ for an eight-hour workday. Both the manganese concentration and the total welding fume concentration are significantly lower than the OSHA standards. This is significant especially when considering that the skin contact of the welder is dramatically decreased compared to when a conventional respirator is utilized during welding.

As shown in FIG. 1 of the drawings, the seat 20 has a housing 22 that contains the plurality of nozzles 28 that are directed along a forward longitudinal axis. The seat 20 further includes a cushion 23 positioned on top of the housing 22 that supports the individual welding. A back support 21 is pivotally connected to the housing 22 and cushion 23 by a pair of hinge members 25a–b. The back support 21 is positionable substantially flush with the cushion 23 when in the storage position. The housing 22 is positionable on a rail 12 that is being welded on as best shown in FIG. 1.

Figure 2:
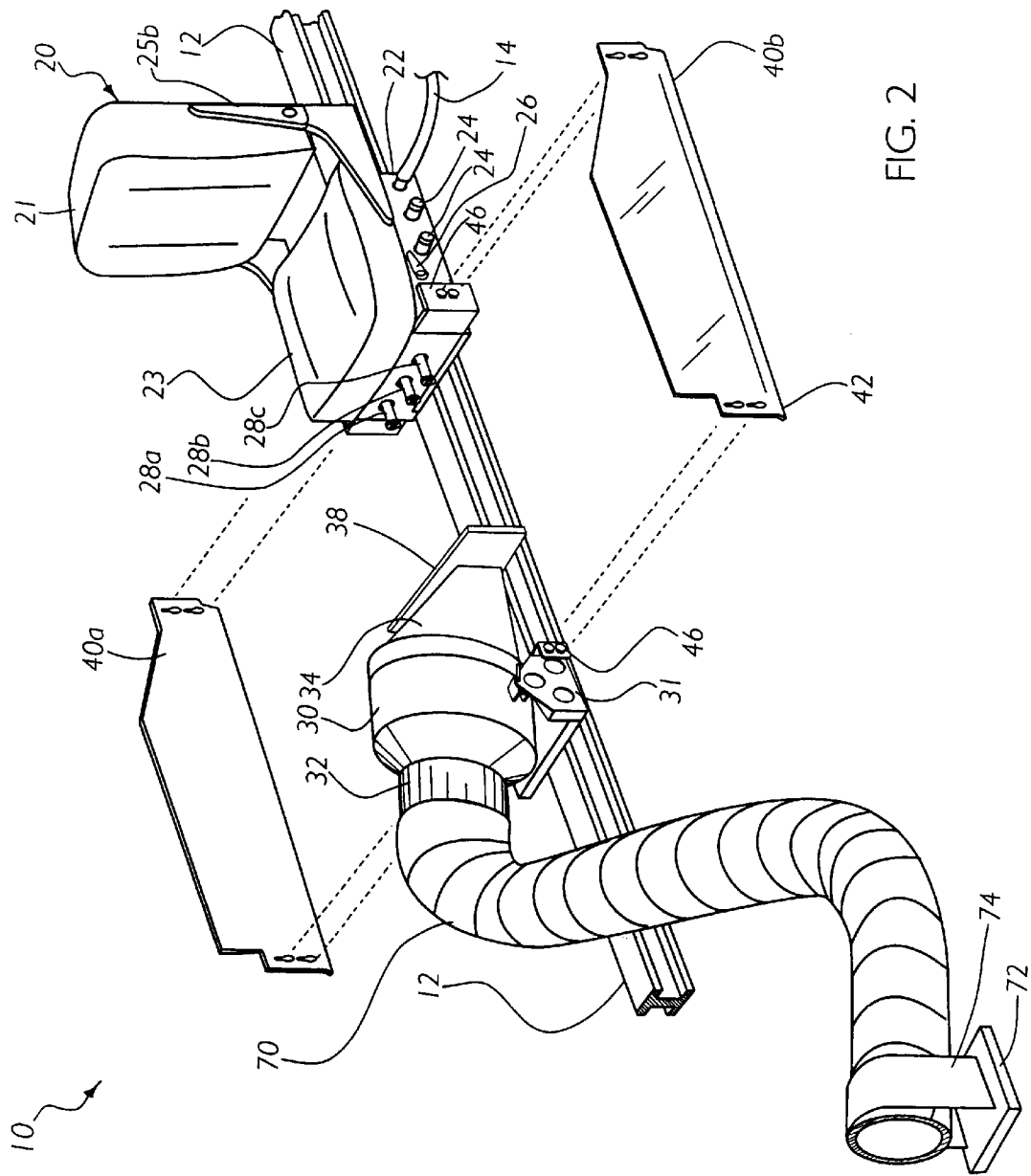
FIG. 2 is a side view of the present invention positioned upon a rail.
Figure 3:
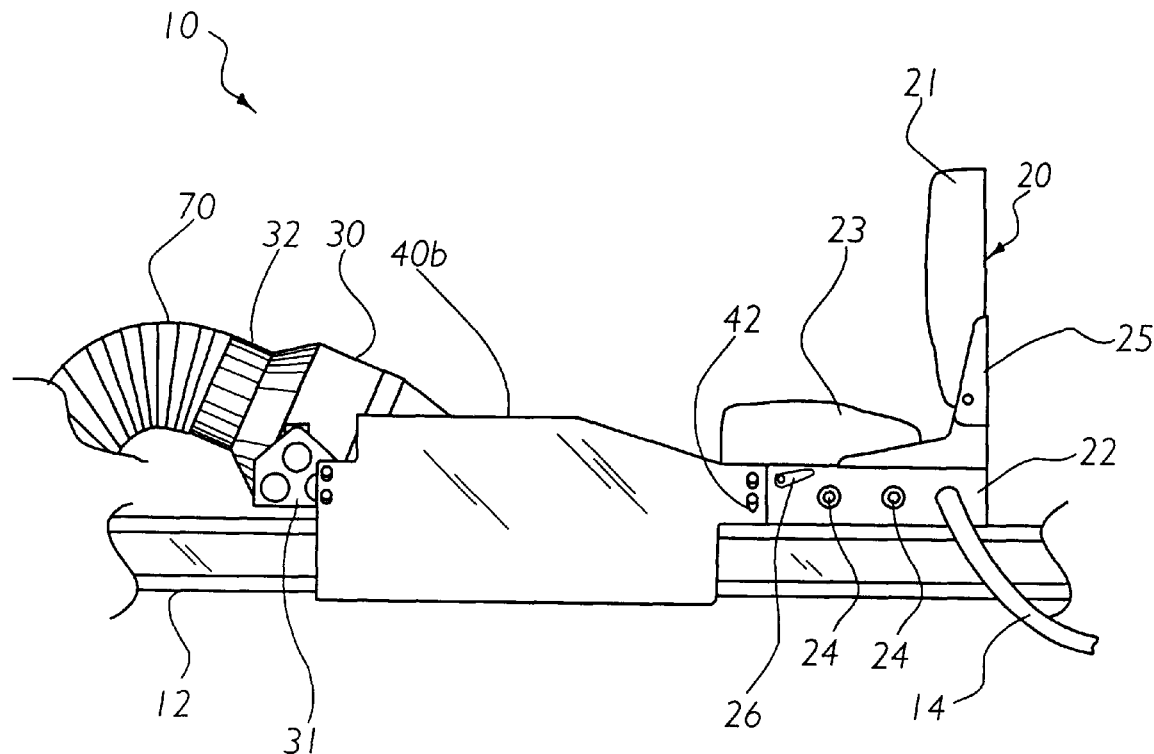
FIG. 3 is a cross sectional view taken along line 3—3 from FIG. 1 disclosing the intake of the exhaust fan.

As shown in FIGS. 1 through 3 of the drawings, an air supply hose 14 is removably attachable to an unnumbered coupler attached to the side of the housing 22. The unnumbered coupler is fluidly connected to the control valve 26 by a conventional tube. The plurality of air nozzles 28 are fluidly connected to the control valve 26 opposite of the unnumbered coupler. The control valve 26 is adjustable by the user to vary the amount of airflow released through the plurality of air nozzles 28 depending upon work and weather conditions. There is also a pair of auxiliary couplers 24 attached to the housing 22 and fluidly connected to the conventional tube for allowing air-powered tools to be utilized simultaneously during welding. The air nozzles 28 are attached to the housing 22 in a front portion of the seat 20 directed toward the welding area. The air nozzles 28 are preferably individually adjustable for allowing various airflow patterns and pressures.

Figure 4:
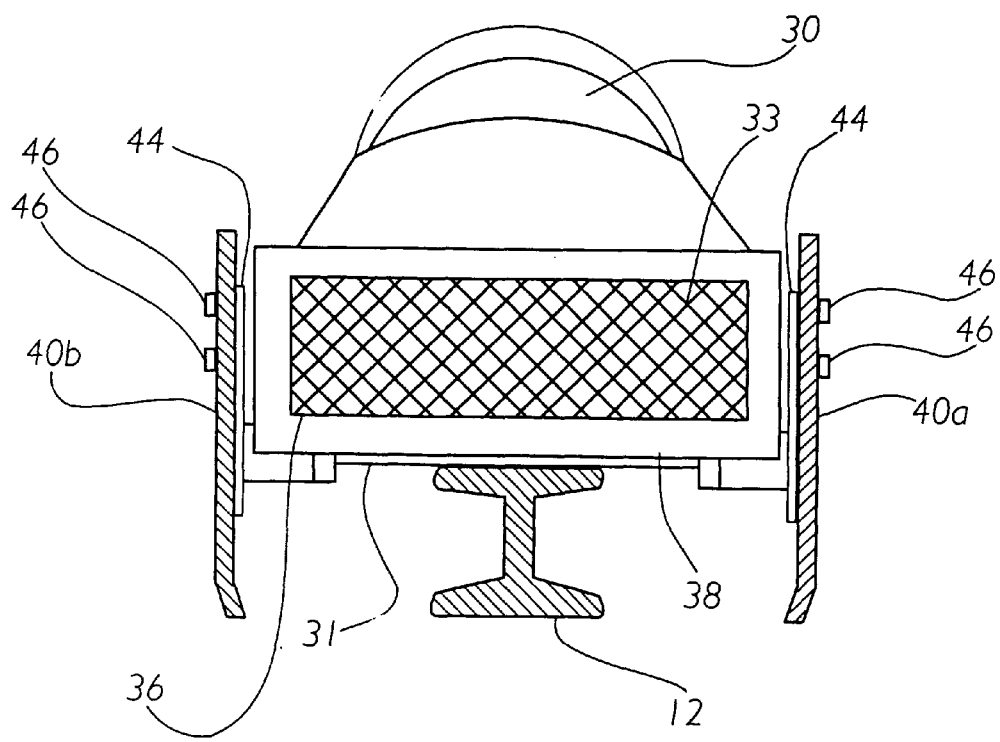
FIG. 4 is a top view of the present invention.
Figure 5:
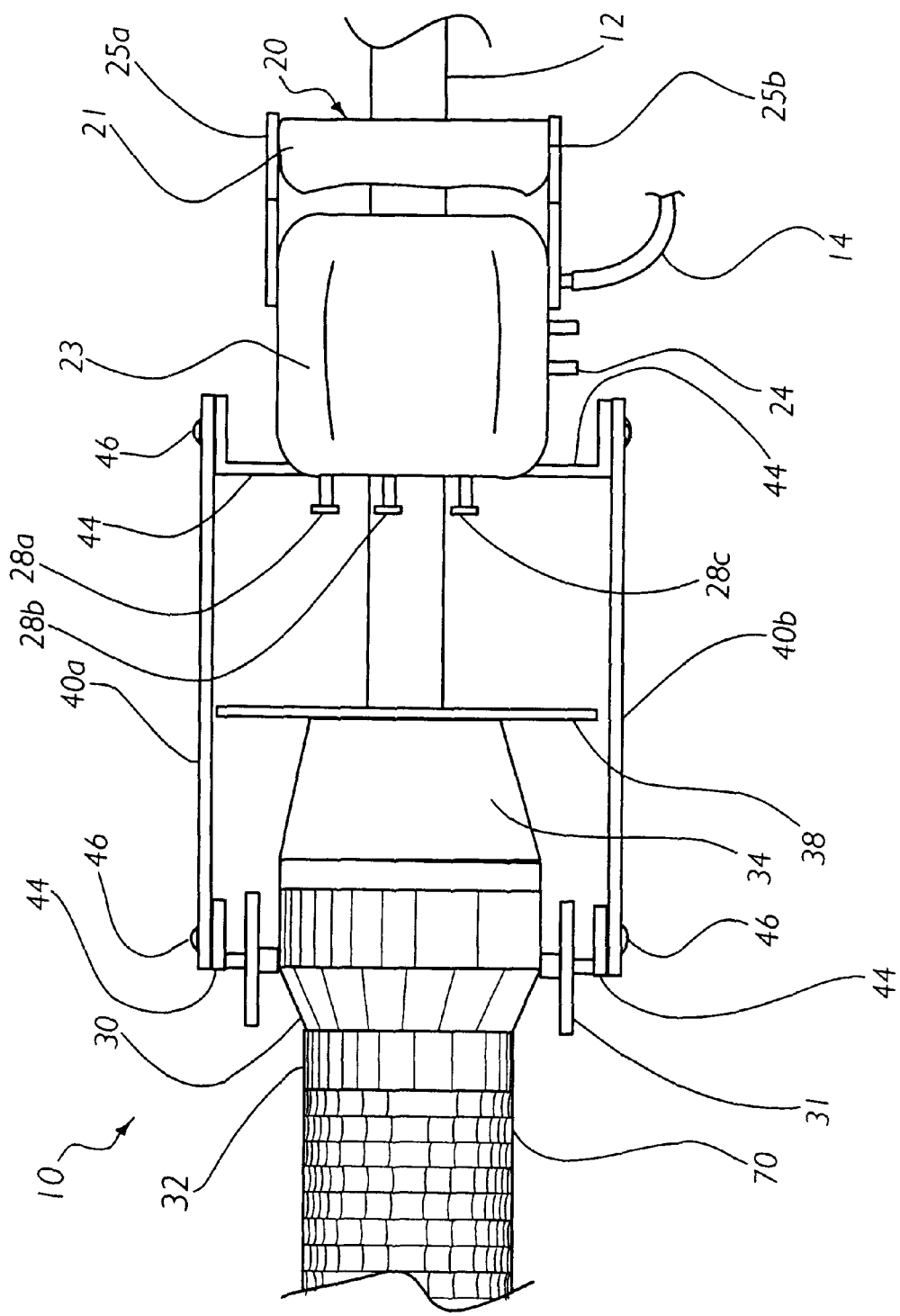
FIG. 5 is a plan view of the total arrangement.

As best shown in FIGS. 4 and 5, the exhaust fan 30 includes an intake manifold 34 that has an opening 36. The exhaust fan 30 may be powered by hydraulic or electric power. The opening 36 preferably has a reticulated mesh 33 surrounding it for preventing damage to the exhaust fan 30 or injury to the user as shown in FIG. 4. As best shown in FIG. 2 of the drawings, the intake manifold 34 is slanted downwardly toward the distal end so as to be positioned closer to the welding area. A flange 38 preferably surrounds the distal end of the intake manifold 34 for preventing fresh air surrounding the exhaust fan 30 from entering the intake manifold 34, thereby maximizing the amount of contaminated air from the welding area drawn into the intake manifold 34.

As shown in FIGS. 1 through 3 of the drawings, an exhaust fan 30 includes an exhaust manifold 32 opposite of the intake manifold 34. The exhaust fan 30 further includes a support structure 31 for pivotally supporting the exhaust fan 30 as shown in FIGS. 1 through 3. The exhaust tube 70 is attached to the exhaust manifold 32 as shown in FIGS. 1 through 3 of the drawings. The distal end of the exhaust tube 70 is received by a U-shaped member 74 attached to a base 72 for maintaining the position of the distal end of the exhaust tube 70. The exhaust tube 70 is preferably constructed from a corrugated flexible material for allowing sufficient extension and contraction.

As best shown in FIGS. 2 and 5, a pair of brackets 44 is attached to the sides of the support structure 31 of the exhaust fan 30, and another pair of corresponding brackets 44 is attached to the sides of the housing 22 of the seat 20. A pair of flanged end rods 46 is secured to each of the brackets 44 as best shown in FIG. 2 of the drawings. As shown in FIGS. 1, 2 and 5, a pair of side members 40a–b include four pairs of slotted apertures 42 for catchably receiving the corresponding four pairs of flanged end rods 46.

In use, the user positions the seat 20 near the area where the welding is to occur. The exhaust fan 30 is thereafter positioned near the seat 20 with the opening 36 of the intake manifold 34 in opposition to the air nozzles 28 as shown in FIG. 5 of the drawings. The user then attaches the exhaust tube 70 to the exhaust manifold 32 and positions the distal end of the exhaust tube 70 away from the seat 20 depending upon the direction of the wind. The pair of side members 40a–b are attached to the brackets 44 by manipulating the position of the exhaust fan 30 relative to the seat 20. The air supply hose 14 is attached to the unnumbered coupler and the user then adjusts the control valve 26 accordingly to the desired air pressure. The user then activates the exhaust fan 30 and begins to weld while sitting in the seat 20. As the welding fumes radiate from the welding area, the pressurized air from the air nozzles 28 propels the fumes away from the seat 20 and the user. The side members 40a–b guide the propelled fumes toward the opening 36 within the intake manifold 34. The fumes are thereafter drawn into the intake manifold 34 into the exhaust fan 30. The fumes are then propelled through the exhaust tube 70 until they are radiated out from the distal end of the exhaust tube 70 a significant distance away from the user. This process allows the user to weld for extended periods of time without wearing a conventional respirator as required by OSHA.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable welding ventilation system, comprising:

an air-dispensing means for expelling pressurized air toward a welding are a thereby propelling welding fumes away from a user;

an exhaust means for drawing in said fumes and thereafter dispersing said fumes a finite distance away from said user; and a pair of side members removably attachable between said air-dispensing means and said exhaust means for creating an air channel for guiding said fumes into said exhaust means.

2. The portable welding ventilation system of claim 1, wherein said exhaust means comprises:

a fan;

an intake manifold connected to said fan; and an exhaust manifold connected to said fan opposite of said intake manifold.

3. The portable welding ventilation system of claim 1, including a length of exhaust tube attached to said exhaust manifold for transporting said fumes away from said user.

4. The portable welding ventilation system of claim 3, wherein said air-dispensing means comprises at least one air nozzle attachable to a pressurized air supply.

5. The portable welding ventilation system of claim 4, wherein the distal end of said intake manifold includes a flange for preventing fresh air surrounding said fan from entering said intake manifold.

6. The portable welding ventilation sysytem of claim 5, wherein said air-dispensing means further comprises a housing that contains said at least one air nozzle.

7. The portable welding ventilation system of claim 6, wherein said air-dispensing means further comprises a seat attached to said housing for supporting said user during welding.

8. The portable welding ventilation system of claim 7, including a control valve fluidly positioned between said at least one air nozzle and said pressurized air supply for allowing said user to adjust the airflow radiated from said at least one air nozzle.

9. The portable welding ventilation system of claim 8, wherein there are a plurality of air nozzles.

10. The portable welding ventilation system of claim 9, wherein said plurality of air nozzles are individually adjustable for allowing a adjustment of the flow of air.

11. The portable welding ventilation system of claim 10, wherein said exhaust tube is comprised of a flexible material.

12. The portable welding ventilation system of claim 11, wherein said housing includes at least one auxiliary coupler fluidly connected between said control valve and said pressurized air supply.

13. A portable welding ventilation system, comprising:

an exhaust means for drawing in welding fumes and thereafter dispersing said welding fumes a finite distance away from said user; and a pair of side members removably attachable about said exhaust means for creating an air channel for guiding said fumes into said exhaust means, wherein said pair of side members are positionable about an article being welded.

14. The portable welding ventilation system of claim 13, wherein said exhaust means comprises:

a fan;

an intake manifold connected to said fan; and an exhaust manifold connected to said fan opposite of said intake manifold.

15. The portable welding ventilation system of claim 14, including a length of exhaust tube attached to said exhaust manifold for transporting said fumes away from said user.

* * * * *